Patented May 8, 1951

2,551,952

UNITED STATES PATENT OFFICE 2,551,952

MASTIC SEALING COMPOUND

Gerald E. Kunkle, Vandergrift, Pa., assignor to Pittsburgh Plate Glass Co., Allegheny County, Pa., a corporation of Pennsylvania No Drawing. Application September 9, 1948, Serial No. 48,539

6 Claims. (Cl. 260—28.5)

This invention relates to plastic compositions and more particularly to a mastic caulking and sealing compound.

One object of the invention is to provide a caulking and sealing compound which is particularly stable to thermal and ultraviolet change and yet exhibits satisfactory adhesion to both glass and metal surfaces.

Another object of my invention is to provide a mastic compound which possesses a low vapor, especially moisture vapor, diffusion factor.

A further object of this invention is the provision of a caulking and sealing composition which is primarily intended for use in the formation of multiple glazed units.

Other objects and advantages of my invention will be apparent from the following detailed description of certain embodiments thereof.

In the development of multiple glazed units, which comprise two or more plates of glass secured in spaced relation, it was readily apparent that difficulty was to be encountered in effecting an adequate seal for the enclosed air spaces. Such seal was necessary to eliminate, as far as possible, the admission of moisture into the closed air spaces wherein, under proper conditions, it would condense and impair the value of the multiple glazed unit.

The sealing media are preferably resilient, thus eliminating glass and metals, although some flexible metal joints are possible. In the latter case, however, difficulty would be experienced in uniting the metal to the glass plates. Most of the known adhesives and mastics are found to be highly permeable to moisture vapor or initial impermeability and flexibility are destroyed under severe weathering conditions. Certain plastics are, however, known to have exceptional resistance to the passage of water vapor. Polyvinylidene chloride, polyethylene and polyisobutylene are typical examples of these plastics.

Polyvinylidene chloride and polyethylene although flexible, dense and impermeable to water vapor lack adhesive properties and before they could be employed for spacing or sealing purposes it would be necessary to provide separate adhesives in order to secure them in place.

Polyisobutylene possesses strong adhesive properties and in most forms, exhibits satisfactory adhesion for both glass and metal surfaces. As hereinbefore mentioned, polyisobutylene has a low rate of moisture intermission. Furthermore, it is resilient and is sufficiently stable to thermal and ultraviolet change to permit its application in exposed places.

Despite indications that polyisobutylene per se would constitute a highly satisfactory caulking and sealing material, it possesses an inherent weakness, namely plastic flow, even in its more highly polymerized forms which normally precludes such application. Where polyisobutylene per se is used as the sealing medium for a multiple glazed unit it gradually extrudes from the vertical surfaces under the action of this plastic flow thus destroying the seal originally produced. Certain attempts to modify the nature of the polyisobutylene were successful in reducing the plastic flow thereof but at the same time, other physical properties of the polyisobutylene were materially altered.

I have now discovered and it is the basis of my invention that a suitable mastic compound can be formulated by incorporating carbon black with polyisobutylene and the mixture will possess optimum physical characteristics essential for application in multiple glazing constructions.

Isobutylene polymers possessing a wide range of molecular weights are readily obtainable. For the purposes of this invention it is essential that the molecular weight be in the range of 10,000. Where the molecular weight is below this value, compositions based thereon exhibit both poor weathering and flow characteristics. Polymers having molecular weights in excess of this range are possessed of reduced adhesive properties.

The 10,000 molecular weight range isobutylenes can further be classified as soft, medium soft, medium hard, and hard: grades established by the penetrometer test wherein the penetration of a needle under a fixed load of 50 gms. in five seconds at 80° F. is measured. The penetrometer value under these conditions varies from 6.5 to 12 and any of the polyisobutylenes in the 10,000 molecular weight range and in this range of penetrometer values is contemplated for use in my invention.

The selected polyisobutylene is modified by the incorporation therewith of carbon black. The amount of carbon black admixed with the resinous material will, to a large extent, control the flow characteristics and adhesiveness of the mixture. Lower percentages of black yield softer materials having increased flow and tack, whereas higher percentages of black produce firmer materials having a greater resistance to flow together with reduced adhesiveness. The formulation, obviously, will vary depending upon the characteristics desired therein. For most purposes, however, from 30 to 50 percent by weight of carbon black can be utilized with from 70 to 50 percent by weight of polyisobutylene (approx. 10,000 M. W.) to form a satisfactory caulking compound.

It is recognized that carbon blacks differ widely in particle size, structure or bond strength, and pH depending upon the process by which they are prepared. Furnace blacks, for example, can possess an average particle size from 45 to 90 millimicrons whereas channel blacks will have an average particle size of from 10 to 100 millimicrons. The small particle size blacks as a rule reinforce polyisobutylene more than the large particle size blacks, at a given loading. It is preferred that the average particle size be approximately 50 millimicrons. It is also preferred to employ furnace blacks rather than channel blacks in order that the compositions will demonstrate improved resistance to weathering.

Apparently the structural, or bond strength, differences between channel and furnace blacks effecting their reinforcing abilities are also present between various grades of furnace blacks and occasion different results with their employment. My tests have demonstrated that a furnace black having an average particle size of from 45 to 55 millimicrons or a surface area of from 5.5 to 7 acres per pound (a measure established in Columbian Colloidal Carbons, vol. 5, No. 5) and a structure index of approximately 160 (a second measure established in Columbian Colloidal Carbons, vol. 5, No. 5) is most suited as a reinforcing agent for polyisobutylene (10,000 M. W.).

A further criterion for the carbon black is its moisture content. It has been established that a maximum of 1% moisture, as determined by a volatile test at 250° F., is permissible where the composition is to be used in multiple glazing. A greater moisture content reduces the adhesiveness of the mastic composition and also reduces its resistance to moisture penetration.

Compounding of a plastic and carbon black can readily be effected in standard mixing apparatus. I have found the most uniform dispersion can be obtained by initiating milling with about one-half the total amount of polyisobutylene, gradually adding thereto the entire amount of carbon black, continuing milling until the dispersion is substantially complete and finally blending in the remainder of the polyisobutylene. Mixing can be facilitated, if necessary, by heating the apparatus somewhat above 100° F., to soften the polyisobutylene.

My invention may be further illustrated by the following specific examples:

*Example I*

A mixture of 77 percent by weight of polyisobutylene (M. W. 10,000) and 23 percent by weight of lamp black having an average particle size of 97 millimicrons and a surface area of 2.6 acres per pound was prepared by milling the ingredients on a two-roll mill. The final composition was comparatively soft with excessive flow characteristics but it exhibited good adhesion for both glass and metals.

*Example II*

A second composition containing 68 percent by weight of polyisobutylene (M. W. 10,000) and 32 percent by weight of channel black having an average particle size of 43 millimicrons and a surface area of 7.3 acres per pound possessed improved flow characteristics and also had good adhesion for both glass and metals. In this instance, it is probable that the improved results were obtained in a large measure from the use of a more finely divided carbon black.

*Example III*

To demonstrate more conclusively the effect of carbon particle size, a mixture of 80 percent by weight of polyisobutylene (M. W. 10,000) and 20 percent by weight of a channel black having an average particle size of 13 millimicrons and a surface area of 22 acres per pound was prepared. The material was extremely stiff, exhibited poor adhesion initially and upon weathering there was no tackiness.

*Example IV*

Following the previous examples there were combined 60 percent by weight of polyisobutylene (M. W. 10,000) and 40 percent by weight of a furnace black having an average particle size of 52 millimicrons and a surface area of 6 acres per pound. This material was easily extruded at 200° F. in both bead and ribbon form to permit ease of application. Prolonged exposure to ultra violet light and temperature changes under weathering tests did not materially alter the nature of the composition. Its adhesion to glass and metal was retained.

The flow characteristics of this composition was uniformly satisfactory. For example, an extruded ribbon of the caulking material, having an original thickness of approximately 0.01 of an inch, was placed between sections of polished plate glass and aluminum. The joint so obtained was subjected to a pressure of 10 pounds per linear inch at 160° F. for 500 hours. The thickness of the layer of caulking material decreased to a minimum of approximately 0.002 of an inch, but firm adhesion thereof to the glass and metal was retained.

In testing for moisture vapor transmission, a sheet of the composition 0.04 of an inch in thickness was sealed across the mouth of a Petri dish containing water. A test area of 4.2 square inches was defined with paraffin wax. The cell was exposed at 120° F. over $P_2O_5$, representing a vapor pressure differential of 41.02 millimeters of Hg until a steady weight loss was obtained. This diffusion was determined to be 0.004 gram per day.

*Example V*

Using the components of Example IV, in a 50–50 mixture, the product was inferior in resistance to weathering and somewhat less pliable. For some applications, where these properties are of less importance, the material would serve equally as well as the 60–40 mixture. Of course, by increasing the particle size of the carbon black employed in the 50–50 mixture, it is possible to make a more plastic material.

I have also determined that there is a definite improvement in the adhesive properties of these mastic compositions afforded by the inclusion therein of from 1 to 5 percent by weight of a microcrystalline wax, for example paraffin wax, ceresin wax or petroleum wax, having a melting point above 120° F. The increased adhesiveness so obtained is possible without sacrifice of tensile strength, flow characteristics or water impermeability. It is also indicated that the wax addition to the mastic enhances its resistance to weathering.

To illustrate this embodiment of my invention the following example is given:

Example VI

To the composition of Example IV was added 2 percent by weight of a microcrystalline paraffin wax having a melting point of 190–195° F. Test portions of this material had approximately the flow characteristics and moisture vapor diffusion rate of the original compound without the wax component. The adhesive properties and resistance to weathering of the wax treated material is better than those of the original compound.

What I claim is:

1. A mastic composition consisting essentially of from 30 to 50 percent by weight of carbon black having an average particle size of from 45 to 55 millimicrons and a surface area of from 5.5 to 7 acres per pound substantially uniformly dispersed in from 70 to 50 percent by weight of polyisobutylene having an average molecular weight of 10,000.

2. A mastic composition consisting of a substantially uniform dispersion of 40 percent by weight of carbon black having an average particle size of from 45 to 55 millimicrons and a surface area of from 5.5 to 7 acres per pound in 60 percent by weight of polyisobutylene having an average molecular weight of 10,000 and a penetrometer value of from 6.5 to 12.

3. A mastic composition consisting of a substantially uniform dispersion of 40 percent by weight of furnace black having an average particle size of from 45 to 55 millimicrons and a surface area of from 5.5 to 7 acres per pound in 60 percent by weight of polyisobutylene having an average molecular weight of 10,000 and a penetrometer value of from 9.5 to 10.5.

4. A mastic composition consisting of a substantially uniform dispersion of 40 percent by weight of furnace black having an average particle size of 52 millimicrons, a surface area of six acres per pound and containing a maximum of 1 percent by weight of moisture, in 60 percent by weight of polyisobutylene having an average molecular weight of 10,000 and a penetrometer value of from 9.5 to 10.5.

5. A mastic composition consisting of a substantially uniform dispersion of 40 percent by weight of carbon black having an average particle size of from 45 to 55 millimicrons and a surface area of from 5.5 to 7 acres per pound in 60 percent by weight of polyisobutylene having an average molecular weight of 10,000 and a penetrometer value of from 6.5 to 12, the composition being modified by the inclusion therein of from 1 to 5 percent by weight of a microcrystalline petroleum wax having a melting point above 120° F.

6. A mastic composition consisting of a substantially uniform dispersion of 40 percent by weight of furnace black having an average particle size of 52 millimicrons, a surface area of six acres per pound and containing a maximum of 1 percent by weight of moisture, in 60 percent by weight of polyisobutylene having an average molecular weight of 10,000 and a penetrometer value of from 9.5 to 10.5, the composition being modified by the inclusion therein of about 2 percent by weight of a microcrystalline paraffin wax having a melting point of 190 to 195° F.

GERALD E. KUNKLE.

REFERENCES CITED

The following references are of record in the file of this patent:

UNITED STATES PATENTS

| Number | Name | Date |
|---|---|---|
| 2,131,342 | Baldeschwieler | Sept. 27, 1938 |
| 2,154,089 | Hillman | Apr. 11, 1939 |